United States Patent [19]

Kuriyama et al.

[11] Patent Number: 4,458,186
[45] Date of Patent: Jul. 3, 1984

[54] TRANSISTOR CONTROL DEVICE FOR POWER TRANSISTOR CHOPPER

[75] Inventors: Shigeru Kuriyama; Minoru Kaminoga, both of Katsuta, Japan

[73] Assignee: Hitachi, Ltd., Tokyo, Japan

[21] Appl. No.: 449,663

[22] Filed: Dec. 14, 1982

[30] Foreign Application Priority Data

Dec. 16, 1981 [JP] Japan ................................ 56-201642

[51] Int. Cl.³ ............................................. H02P 5/06
[52] U.S. Cl. ................................ 318/341; 318/345 B; 318/345 F
[58] Field of Search ........... 318/345 R, 345 A, 345 B, 318/345 F, 376, 331, 342, 343, 344, 362, 363, 366, 368, 373, 341, 459, 345 CA, 345 AB, 248; 323/311, 259, 260, 263, 265

[56] References Cited

U.S. PATENT DOCUMENTS

| | | | |
|---|---|---|---|
| 3,414,791 | 12/1968 | Munson et al. | 318/345 CA |
| 3,624,474 | 11/1971 | Nolf | 318/331 |
| 4,028,602 | 6/1977 | Tokuda et al. | 318/345 B |
| 4,233,549 | 11/1980 | Dighe | 318/345 F X |

Primary Examiner—Ulysses Weldon
Attorney, Agent, or Firm—Antonelli, Terry & Wands

[57] ABSTRACT

A transistor control device in a power transistor chopper is arranged to charge a capacitor for feeding a base current to the chopper transistor with electrical energy stored in an impedance of a wiring connecting a DC power source to a load to which the load current is supplied from the DC power source through the chopper.

7 Claims, 9 Drawing Figures

TRANSISTOR CONTROL DEVICE FOR POWER TRANSISTOR CHOPPER

BACKGROUND OF THE INVENTION

1. Field of the Invention

The present invention relates to a transistor control device in use for a power transistor chopper, and more particularly to a control device for controlling a transistor base current in the ON-OFF control of a chopper transistor.

2. Description of the Prior Art

In the power transistor chopper for controlling a DC motor for driving a battery car, a speed of a DC motor is controlled by controlling the ON-duty in the ON-OFF control of a transistor connected between a DC power source and the DC motor. The transistor used in such power chopper requires a relatively large base current. In order to feed a base current to the transistor, hitherto, it has been arranged to feed the base current from a power source through a resistor. This arrangement, however, has a problem in that the electrical power loss is large due to the resistor. To solve this problem, it has been also proposed to use a switching regulator. This approach has also a disadvantage that expensive circuit components must be used.

SUMMARY OF THE INVENTION

An object of the present invention is to provide a transistor control device for a transistor chopper with an economical base current supply circuit of low power loss.

According to the present invention, the above object is achieved by a transistor control device in which the electro-magnetic energy, which is stored in inductance of the wiring of the chopper circuit when the chopper is rendered OFF, is transferred to a capacitor and used for the base current of the transistor when the chopper is to be rendered ON.

DESCRIPTION OF THE PREFERRED EMBODIMENTS

Figure 1:
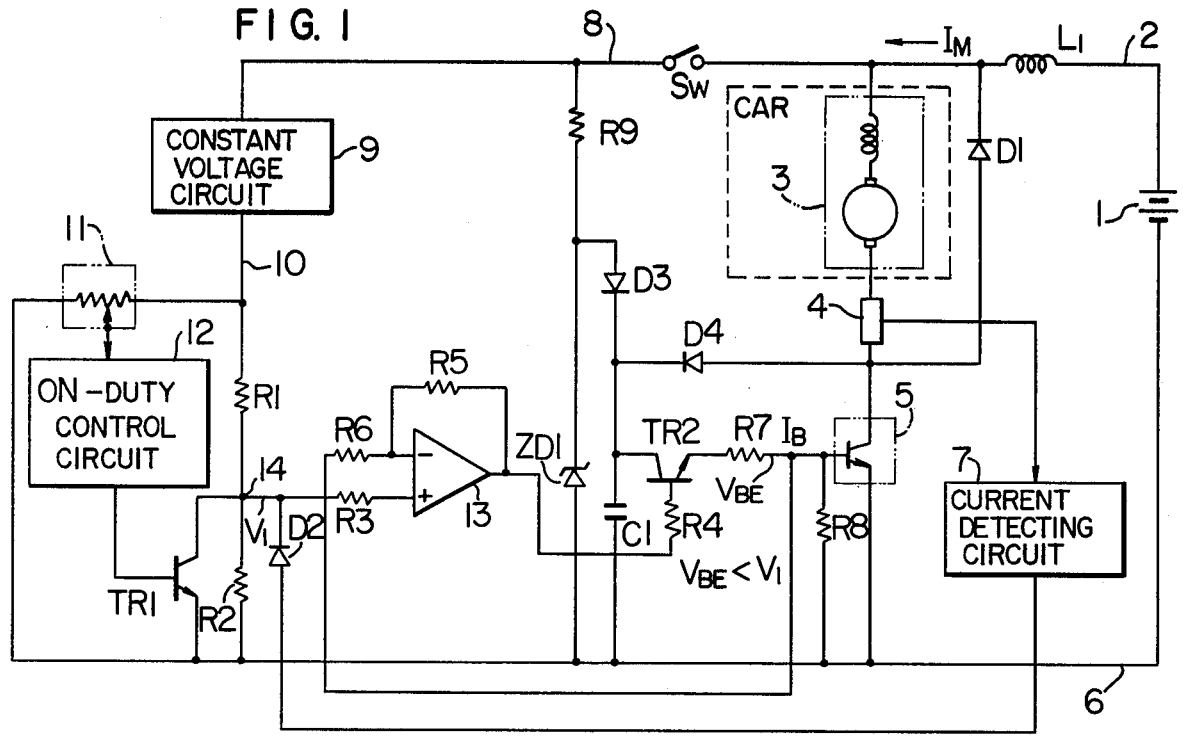
FIG. 1 is a circuit diagram of an arrangement of an embodiment according to the present invention.

A control device according to the present invention will be described referring to FIG. 1, in the case where it is applied for a transistor chopper for controlling a DC motor for driving a battery car. In the figure, a DC power source 1 such as a battery is connected at the positive terminal to a power line 2 which is further connected to one end of a drive motor 3 for driving a battery car. The other end of the drive motor 3 is connected through a current sensor 4 to the collector of a transistor 5 constituting a transistor chopper circuit. The emitter of the transistor 5 is connected to a power line 6 connected to the negative terminal of the DC power source 1. A diode D1 is connected across a series circuit of the drive motor 3 and a current sensor 4. A signal sensed by the current sensor 4 is applied as an input to a current detecting circuit 7. A known DC current transformer, a DC shunt, or the like is applicable for the current sensor 4.

The power line 2 is connected to one end of a key switch SW of the battery car and the other end of the key switch is connected to a constant voltage circuit 9 through a power line 8. The constant voltage terminal of the constant voltage circuit 9 is connected to one of the terminals of a potentiometer 11 serving as a voltage divider interlocking with an accelerator. The other terminal of the potentiometer 11 is connected to the power line 6. The output terminal of the potentiometer 11 is connected to an ON-duty control circuit 12 of which the output is connected to the base of a transistor TR1. A junction 14 between resistors R1 and R2 is connected through a resistor R3 to the noninverting input terminal of an operational amplifier 13 and to the cathode of a diode D2 and the collector of the transistor TR1. The anode of the diode D2 is connected to the current detecting circuit 7 and the emitter of the transistor TR1 is connected to the power line 6.

The output of operational amplifier 13 is connected through the resistor R4 to the base of the transistor TR2, and through the resistor R5 to the inverting input of operational amplifier 13. The noninverting input terminal of the operational amplifier 13 is connected through the resistor R6 to the base of the transistor 5.

The base of the transistor 5 is connected to the emitter of the transistor TR2, through the resistor R8. The collector of the transistor TR2 is connected to one end of the capacitor C1 and the cathode of the diode D3. The other end of the capacitor C1 is connected to the power line 6. The anode of the diode D3 is connected through the resistor R9 to the power line 8. A Zener diode ZD1 is connected to a series circuit composed of the diode D3 and the capacitor C1. A junction between the diode D3 and the capacitor C1 is connected to the collector of the transistor 5 through a diode D4. The capacitor C1 is first charged through the resistor R9 and the diode D3 and its maximum charging voltage is determined by the Zener diode ZD1.

In operation, an output voltage from the potentiometer 11, which is controlled according to an amount of depression of the accelerator is, applied to the ON-duty control circuit 12. As will be described hereinafter in detail, the ON-duty control circuit 12 produces a rectangular pulse voltage periodically at a constant period. The pulse width of the rectangular pulse voltage is controlled by an output voltage applied from the potentiometer 11. As will be seen later, the ON-duty of the chopper circuit is given by $(1-q)/p$ where p is the period of the cyclic rectangular pulse voltage and q is the pulse width thereof. The output of the ON-duty control circuit 12 is applied to the base of the transistor TR1. This transistor TR1 is ON when the rectangular pulse voltage is present at the output of the ON-duty control circuit 12. The transistor TR1 is OFF when it is not present thereat. When the transistor TR1 is OFF, a junction 14 has a voltage V1 as formed by dividing a constant output voltage of the constant voltage circuit 9 by the resistors R1 and R2. The voltage V1 is applied to the noninverting input terminal of the operational amplifier 13. When the voltage applied to the noninverting input terminal is not lower than that applied to the inverting input terminal, the output signal of the operational amplifier 13 is proportional to the voltage at the noninverting input terminal. On the contrary, when the former is lower than the latter, the output voltage is "0". The base potential $V_{BE}$ changes depending on presence or not of the base current. In either case, the circuit elements are so selected as to satisfy $V_{BE} < V1$. When the voltage V1 is applied to the noninverting input terminal of the operational amplifier 13, its output is equal to V1 or proportional to V1. Then, the transistor TR2 is ON.

The capacitor C1 has a capacitance capable of storing electric energy enough to feed the base current to the transistor 5. In case where the drive motor has a rated capacitor 48 V×200 A and the base current of the transistor for chopping the motor current is 2A, the capacitance of the capacitor C1 is about 1000 μF. The capacitor C1 may be composed of a single capacitor or a plurality of relatively small capacitors connected in parallel. At the start of the operation, the switch key SW is turned on and the capacitor C1 is charged up to a predetermined voltage as given by the Zener diode $ZD_1$, through the resistor R9 and the diode D3. The charging circuit is used only for charging the capacitor C1 at the start of operation. Therefore, the charging time may be selected to be relatively long, and it is desired to decrease the power loss caused by the resistor R9 as low as possible, for example, by using a relatively large resistance for the resistor R9.

When the transistor TR2 is ON, the capacitor C1 is discharged to the base of the transistor 5, through the transistor TR2 and the resistor R7. Then, the transistor 5 is conductive and the drive current is supplied from the power source 1 to the motor 3. At this time, the base potential $V_{BE}$ of the transistor 5 is charged up to the potential corresponding to the charging voltage across the capacitor C1. As mentioned before, $V_{BE} < V1$ is established so that the output voltage of the operational amplifier 13 is proportional to the voltage V1 applied to the noninverting input terminal of the operational amplifier 13. Therefore, the transistor 5 is kept conductive. When a rectangular pulse appears at the output of the ON-duty control circuit 12, the transistor TR1 is ON, the potential at the junction 14 is low, and the output of the operational amplifier 13 is also low. The result is that the transistor TR2 is OFF, the base current of the transistor 5 is cut off, and the transistor 5 is OFF. During the period that the transistor 5 is OFF and the motor current is cut off, the capacitor C1 is charged in a manner to be given later, and serves as a base current source when the transistor TR2 is to be subsequently ON. In this way, the transistor 5 is turned on or off by the output signal from the ON-duty control circuit 12, thereby to control the ON-duty of the motor.

Now, explanation will be made of how the capacitor C1 is charged when the transistor 5 is rendered OFF.

At the OFF state of the transistor 5, an inductance L1 associated with wires connecting the battery to the motor terminals stores energy of $\frac{1}{2}L_1 I_M^2$, where $I_M$ is the current flowing through the motor 3. The energy is charged into the capacitor C1 through the motor winding and the diode D4. An increased voltage $\Delta V$ in the capacitor C1 is given by $$\tfrac{1}{2}C_1(\Delta V)^2 = \tfrac{1}{2}L_1 I_M^2$$

This indicates that the capacitor C1 is charged by a voltage of $\Delta V$.

The charge stored in the capacitor C1 is discharged to the base of the transistor 5 when the transistor TR2 is to be rendered ON. In the prior art circuit, a Zener diode has been connected, between the power line 6 and the junction of diodes D1 and D4 for releasing therethrough the energy stored in the inductance $L_1$.

Figure 2:
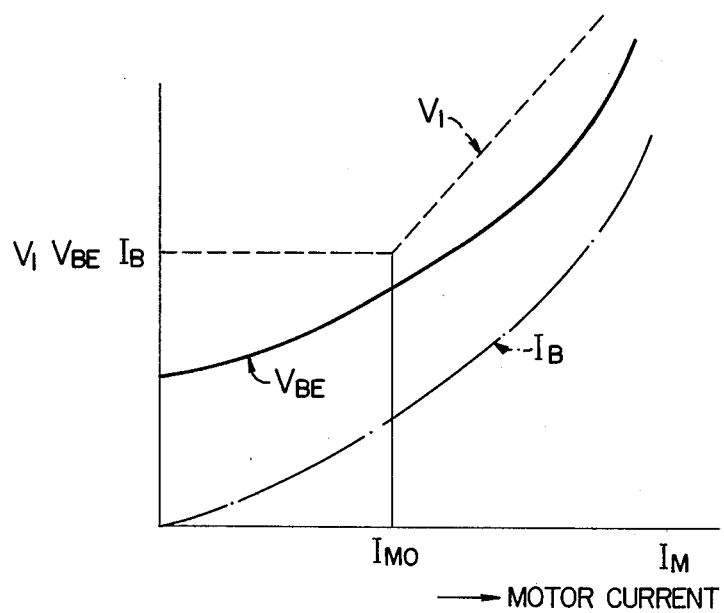
FIG. 2 is a graph showing a characteristic of a base current of a chopper transistor with respect to a load current.

FIG. 2 illustrates characteristics of the base current IB and the base voltage $V_{BE}$ of the transistor necessary for causing the motor current $I_M$ to flow. In the graph, the motor current is represented by the ordinate. Desirably, the base current IB is increased with an increase of the motor current $I_M$ so that the transistor 5 is used in the saturation region. The electrical energy for charging the capacitor C1 is proportional to the square of the motor current $I_M^2$, as described above. Accordingly, the charging voltage for the capacitor increases with an increase of the motor current to satisfy the above requirement. However, with an increase of the motor current, the base voltage $V_{BE}$ is also required to increase, and therefore the voltage V1 at the noninverting terminal of the operatinal amplifier 13 must be increased correspondingly. To this end, the current detecting circuit 7 is provided, as will be given later in detail. The provision of the current detecting circuit 7 allows an increase of the voltage V1 when the motor current increases, as shown in FIG. 2. Further, the base current IB also increases with an increase of the motor current $I_M$ exceeding a predetermined value.

The arrangement of the ON-duty control circuit 12 will be described referring to FIG. 3. The ON-duty control circuit 12 may be any known circuit which produces a rectangular cyclic pulse voltage of a constant period and with its ON-duty controllable by the input voltage. It may be convenient to use, for example, a commercially available linear IC such as HA17524 manufactured by HITACHI Ltd. in Japan. The circuit shown in FIG. 3 uses the linear IC denoted as IC1. As shown, the output voltage of the potentiometer 11 is applied as an input voltage 20 to pin 2 of the IC1, through an operational amplifier OP1 for impedance matching. The output pulse of IC1 appears at an output terminal 22 led from the connection of pins 12 and 13. The period of the output pulse is determined by a resistor R23 connected to pin 6 and a capacitor C10 connected to pin 7. The output terminal is connected to the base of the transistor TR1.

Figure 3:
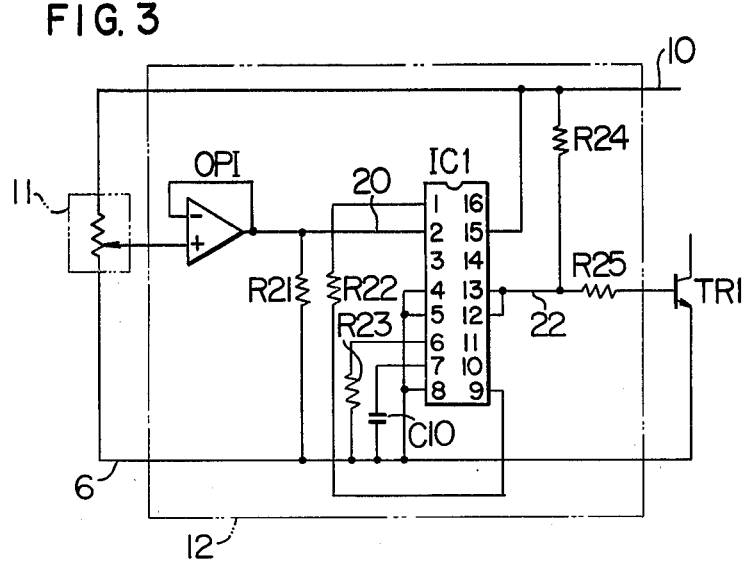
FIG. 3 is a circuit diagram of an ON-duty control circuit 12 used in the circuit of FIG. 1.
Figure 4:
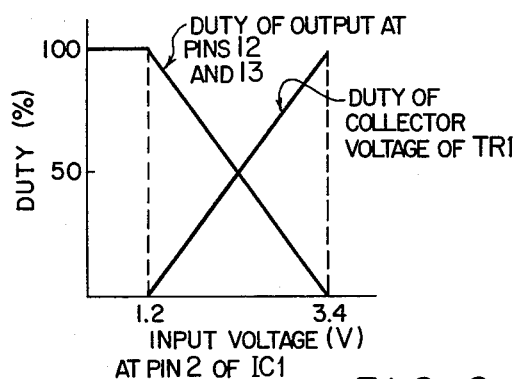
FIG. 4 is a graph illustrating a relationship between an input signal to the circuit of FIG. 3 and the ON duty.

FIG. 4 illustrates a relationship of the input voltage to the circuit of FIG. 3 vs. the duty of the output pulse of IC1 and the duty of the collector voltage of TR1. As shown, the duty of the collector voltage of TR1 almost linearly changes from 0 to 100% with a change of the input voltage from about 1.2 V to 3.4 V.

Figure 5:
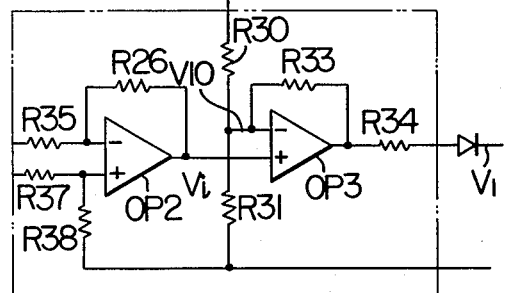
FIG. 5 is a circuit diagram illustrating an arrangement of a current sensing circuit.

The arrangement of the current detecting circuit 7 will be described referring to FIG. 5. In the current detecting circuit 7, a DC shunt is used for the current sensor 4. A voltage drop across the shunt 4 is amplified by the operational amplifier OP2. The output signal from the OP2 is applied to the noninverting input terminal of an operational amplifier OP3. The inverting input terminal of the operational amplifier OP3 is impressed with a fixed voltage V10 as obtained by dividing the source voltage by resistors R30 and R31. The OP3 operates in such a manner that its output is at a fixed potential when $Vi \leq V10$ and has a voltage proportional to Vi when $Vi > V10$. Thus, the output voltage changes with a change of the motor current, as indicated by V1 in FIG. 2.

In the above embodiment, when the transistor is rendered off, the energy stored in the impedance of the wiring is transferred to the capacitor C1 and then used for feeding the base current IB to turn on the transistor 5. Thus, it is possible to feed the base current with a low power loss, while the cost of the circuit elements are reduced.

Further, the voltage between the collector and the emitter of the transistor 5, which could be greatly increased when the transistor 5 is ON, can be prevented from excessively increasing by charging the capacitor C1. Because of this feature, the voltage resistivity required between the collector and emitter of the transistor 5 can be reduced.

Figure 6:
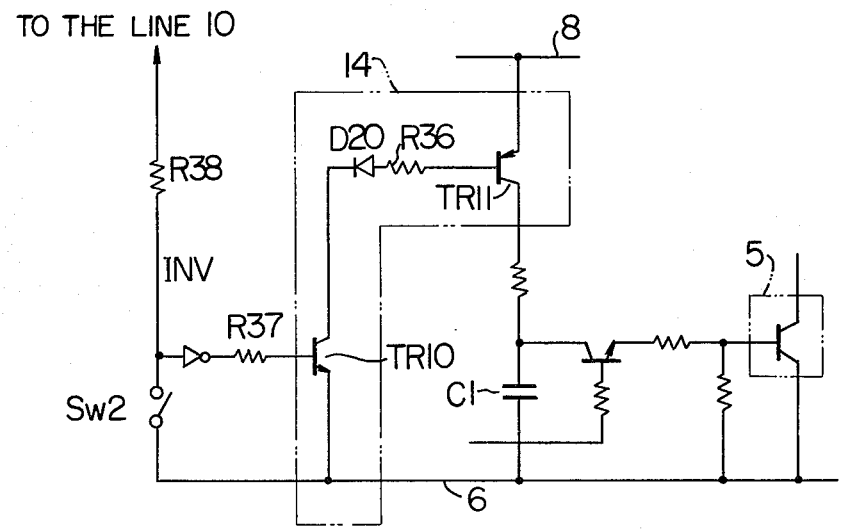
FIG. 6 is a circuit diagram of a main portion of another embodiment according to the present invention.

Another embodiment of the present embodiment will be described referring to FIG. 6. In the figure, like reference numerals designate like or equivalent components in FIG. 1. In the embodiment of FIG. 1, if the transistor 5 is to be operated with its OFF time being zero, or the duty of 100% or near, the charging time of the capacitor is insufficient. As a result, an insufficient amount of base current would be supplied to the transistor 5. To eliminate such problem, the embodiment of FIG. 6 is provided with an auxiliary charging circuit 14. This problem of insufficient charging time will take place when the accelerator is deeply depressed. Therefore, this embodiment uses a switch SW2 which is interlocked with the accelerator and operates when the accelerator is sufficiently depressed, and when the switch SW2 is closed, the output of the inverter INV goes high. The high level output of the transistor TR10 is applied to the base of the transistor 5 to cause it to turn on. As a result, the transistor TR11 is ON and the capacitor C1 is charged through the power line 8.

Alternatively, the switch SW2 may be made to operate when the base voltage $V_{BE}$ of the transistor 5 is reduced lower than a predetermined voltage. At this time, the auxiliary charging circuit 14 is driven in response to the operation of the switch.

In FIGS. 1 and 6, the collector of the transistor 5 and the capacitor C1 are connected through the diode D4. With this connection, a considerably high voltage resistivity is required for the capacitor C1. For example, in the case of the drive motor of a rated capacitor 48 V×200 A, an increased voltage across the capacitor is about 100 V. For this reason, the capacitance of the capacitor must be large, and it requires a large space for mounting.

Figure 7:
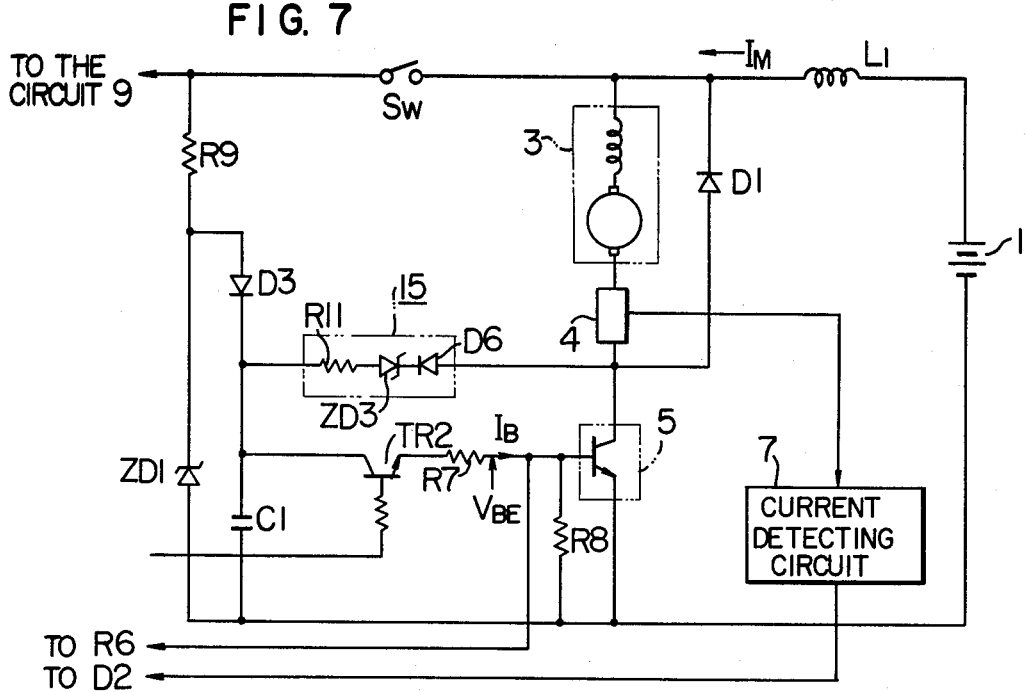
FIG. 7 is a circuit diagram of a main portion of a still another embodiment according to the present invention.

FIG. 7 shows a main portion of still another embodiment according to the present invention which is directed to overcoming the above-mentioned problem.

In this embodiment, the capacitor C1 and the collector of the transistor 5 are connected through a constant-voltage conducting circuit 15. The circuit 15 is composed of a resistor R11, a Zener diode ZD3 and a diode D6, which are connected in series. The remaining portion of the circuit is the same as in FIG. 1. When the collector voltage of the transistor 5 exceeds the sum of the breakdown voltages $V_{ZD1}+V_{ZD2}$ of Zener diodes ZD1 and ZD2, the constant-voltage conducting circuit 15 conducts to charge the capacitor C1 with the energy stored in the impedance of the wiring. Thus, in this embodiment, when the capacitor C1 is charged with the energy stored in the inductance L1, the increased voltage $V_C$ across the capacitor C1 is given $$\tfrac{1}{2} \times C_1 V_C^2 = \tfrac{1}{2} L_1 I_M^2$$

Accordingly, in an example that C1 is 1000 μF, L1 is 4 μH and the motor current $I_M$ is 200 A, $V_C$ is approximately 12.7 V. Thus, when the breakdown voltage $V_{ZD1}$ of the Zener diode ZD1 is 12 V, it is sufficient for the capacitor C1 to have a resistivity against 35 V or so.

Figure 8:
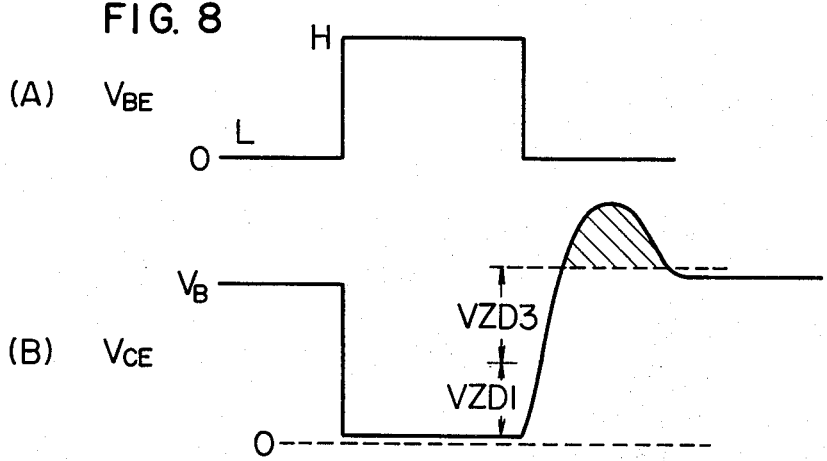
FIG. 8 shows waveforms useful in explaining the operation of the embodiment of FIG. 7.

FIG. 8 illustrates the operation of the embodiment of FIG. 7 as mentioned above. When the transistor TR1 is turned on and the base voltage $V_{BE}$ of the transistor 5 goes high, the base current flows into the transistor 5 and the transistor 5 composing the chopper circuit is turned on. At this time, the collector-emitter voltage $V_{BE}$ of the transistor 5 goes low. When the transistor TR2 is then rendered OFF, the voltage $V_{CE}$ increases. When the voltage $V_{CE}$ exceeds $V_{ZD1}+V_{ZD3}$, the charging of the capacitor C1 starts (as indicated by a shaded portion in FIG. 8(B)).

As described above, the charging voltage across the capacitor C1 can be reduced. Therefore, the voltage resistivity of the capacitor C1 may also be reduced. Further, the voltage resistivity between the emitter and collector of the transistor 5 composing the chopper circuit may be reduced. This feature of the invention is effective to increase the life of the transistor.

Figure 9:
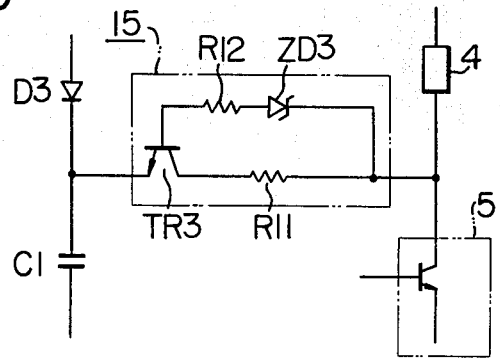
FIG. 9 is a circuit diagram of a main portion of another embodiment of the present invention.

FIG. 9 shows a main portion of yet another embodiment of this invention. The transistor TR3 is connected at its emitter to the capacitor C1, and at its collector to the collector of the transistor 5, via a resistor R11. The base of the transistor TR3 is connected to the collector of the transistor 5, through a resistor R1 and a Zener diode ZD3. With this arrangement, when the collector potential of the transistor 5 exceeds $V_{ZD1}+V_{ZD3}$, the transistor TR3 is rendered conductive to charge the capacitor C1. Therefore, the Zener diode ZD3 is enough to have a current capacitor corresponding to the base current of the transistor TR3. Thus, this embodiment is useful in case where the Zener diode of a large current capacity is unavailable.

It is evident that the constant voltage conducting circuit 15 is applicable for the embodiment of FIG. 1 having no auxiliary charging circuit and the embodiment of FIG. 6 having the auxiliary charging circuit.

While this invention has been described exemplarily in case where the invention is applied to a transistor chopper circuit for controlling a DC motor to drive battery car, it will be obvious for those skilled in the art that various modifications are made without departing from the scope of the invention.

We claim:

1. A control device for a transistor chopper which controls a load current fed from a DC power source to a load by periodically turning on and off a transistor connected between the DC power source and the load, comprising:

capacitor means for storing electric energy to be used for supplying a base current to control the conduction of said transistor;

means for charging said capacitor means with electrical energy stored in impedance means of the wiring connecting said DC power source to said load when said transistor is OFF;

means connected between said capacitor means and said base of said transistor for controlling the base current suppled from said capacitor means to said transistor; and means for charging said capacitor means by said power source when the ON-duty of said transistor exceeds a predetermined value.

2. A control device for a transistor chopper which controls a load current fed from a DC power source to a load by periodically turning on and off a transistor connected between the DC power source and the load, comprising:

capacitor means for storing electric energy to be used for supplying a base current to control the conduction of said transistor;

means for charging said capacitor means with electrical energy stored in impedance means of the wiring connecting said DC power source to said load when said transistor is OFF;

means connected between said capacitor means and said base of said transistor for controlling the base current supplied from said capacitor means to said transistor; and means for charging said capacitor means by said power source when the base potential of said transistor is below a predetermined value.

3. A control device for a transistor chopper which controls a load current fed from a DC power source to a load by periodically turning on and off a transistor connected between the DC power source and the load, comprising:

capacitor means for storing electric energy to be used for supplying a base current to control the conduction of said transistor;

means for charging said capacitor means with electrical energy stored in impedance means of the wiring connecting said DC power source to said load when said transistor is OFF;

means connected between said capacitor means and said base of said transistor for controlling the base current supplied from said capacitor means to said transistor; and means for increasing the base current supplied from said capacitor means to said transistor with increase of said load current exceeding a predetermined level.

4. A control device according to claim 3, wherein said charging means includes a diode connected between the collector of said transistor and one end of said capacitor means.

5. A control device according to claim 3, wherein said charging means includes a switching circuit connected between the collector of said transistor and one end of said capacitor means, said switching circuit being rendered conductive when the collector current of said transistor exceeds a predetermined value.

6. A control device according to claim 3, wherein said load is a DC motor for driving a battery car.

7. A control device for a transistor chopper which controls a load current fed from a DC power aource to a load by periodically turning on and off a transistor connected between the DC power source and the load, comprising:

capacitor means for storing electric energy to be used for supplying a base current to control the conduction of said transistor;

means for charging said capacitor means with electrical energy stored in impedance means of the wiring connecting said DC power source to said load when said transistor is OFF, said charging means including a switching circuit connected between the collector of said transistor and one end of said capacitor means, said switching circuit being rendered conductive when the collector current of said transistor exceeds a predetermined value; and means connected between said capacitor means and said base of said transistor for controlling the base current supplied from said capacitor means to said transistor.

* * * * *

UNITED STATES PATENT AND TRADEMARK OFFICE
CERTIFICATE OF CORRECTION

PATENT NO. : 4,458,186
DATED : Jul. 3, 1984
INVENTOR(S) : Shigeru Kuriyama and Minoru Kaminaga It is certified that error appears in the above—identified patent and that said Letters Patent is hereby corrected as shown below:

IN THE COVER PAGE:

Line [75] Inventors:, delete "Minoru Kaminoga" and insert --Minoru Kaminaga--

Signed and Sealed this

Nineteenth Day of February 1985

[SEAL]

Attest:

DONALD J. QUIGG

Attesting Officer     Acting Commissioner of Patents and Trademarks